Feb. 2, 1965  A. B. ECKERT, JR  3,168,720
CHARACTER READER
Filed April 8, 1960  10 Sheets-Sheet 1

INVENTOR.
ALTON B. ECKERT, JR
BY
Kenyon & Kenyon
ATTORNEYS

Feb. 2, 1965 A. B. ECKERT, JR 3,168,720
CHARACTER READER
Filed April 8, 1960 10 Sheets-Sheet 2

INVENTOR.
ALTON B. ECKERT, JR.
BY
ATTORNEYS

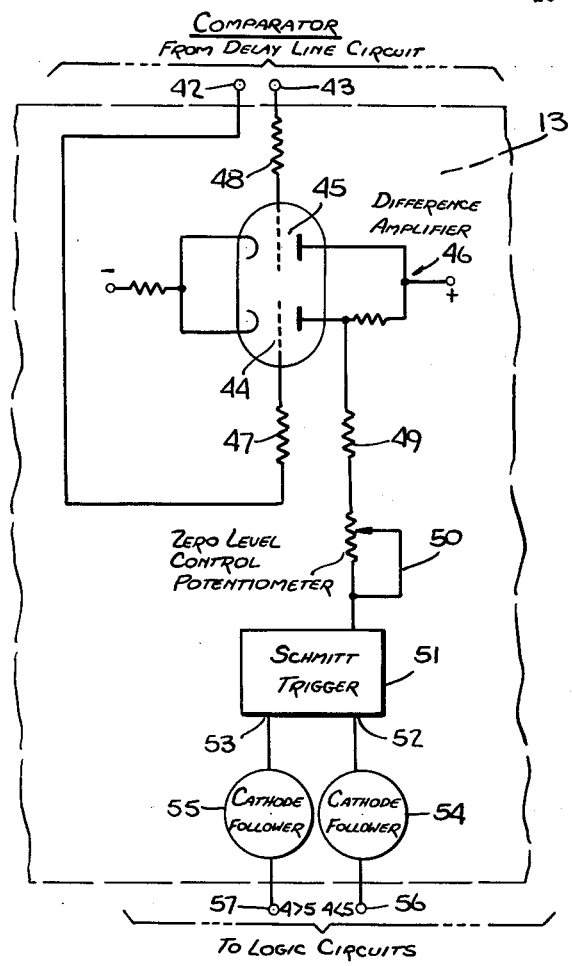
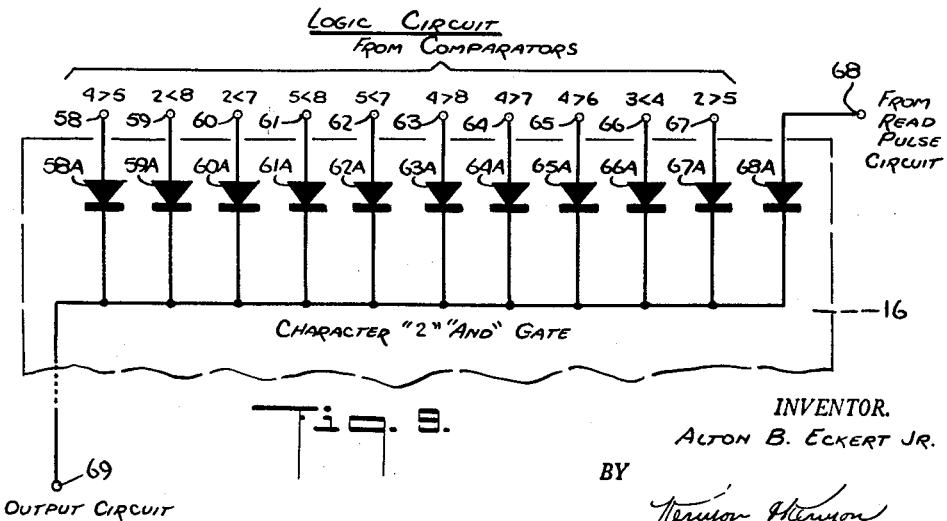
Fig. 8.
Fig. 9.

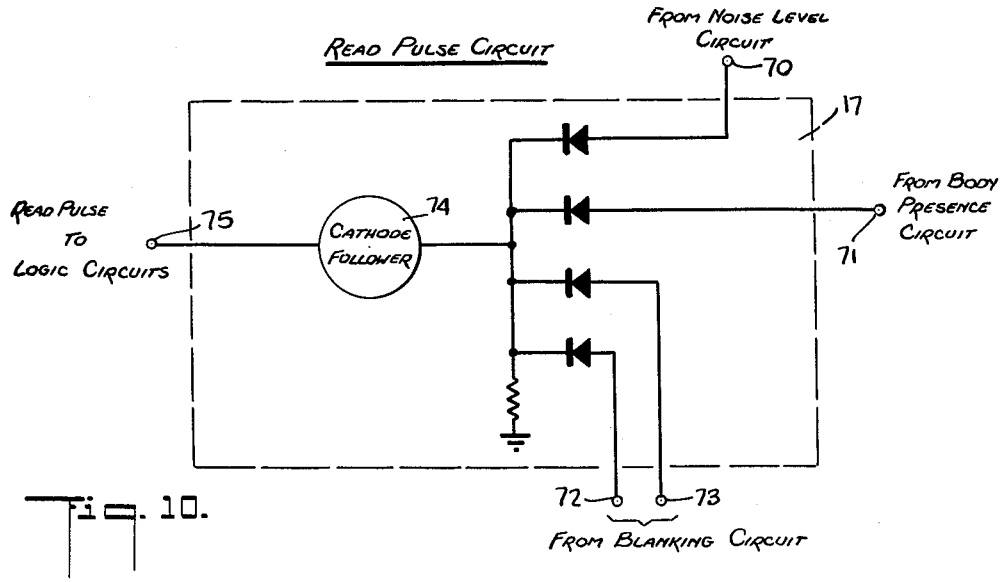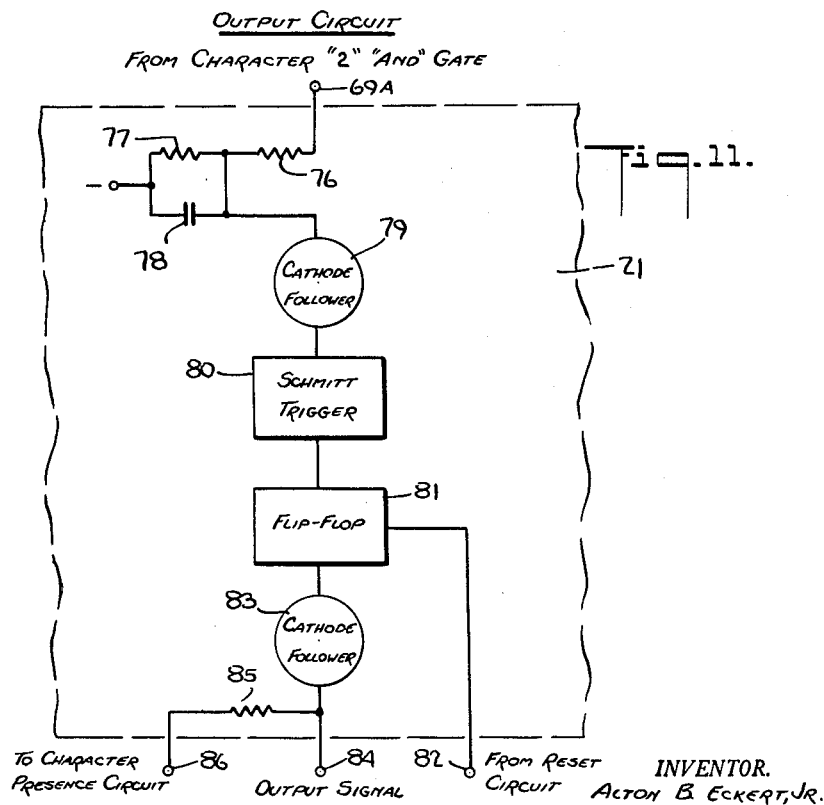

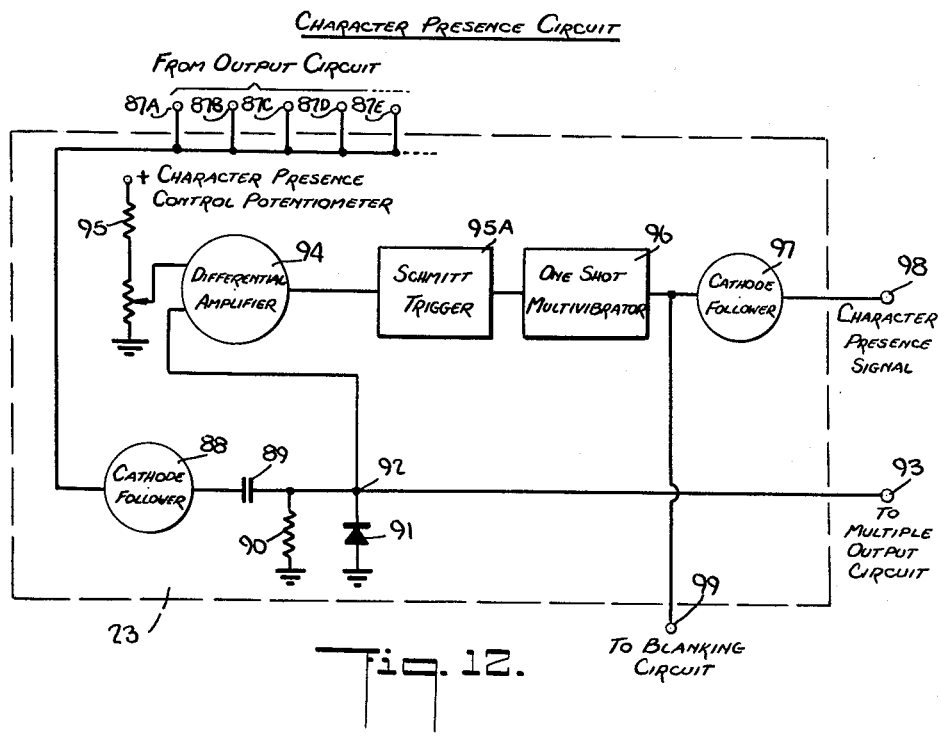
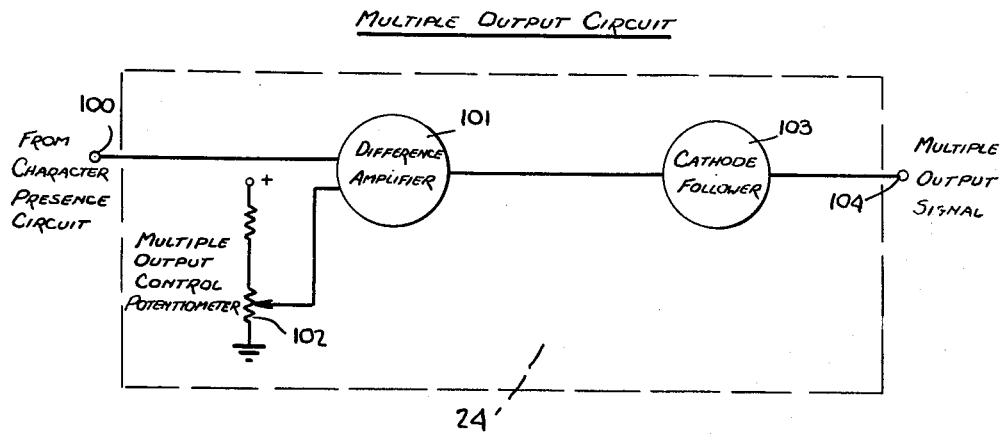

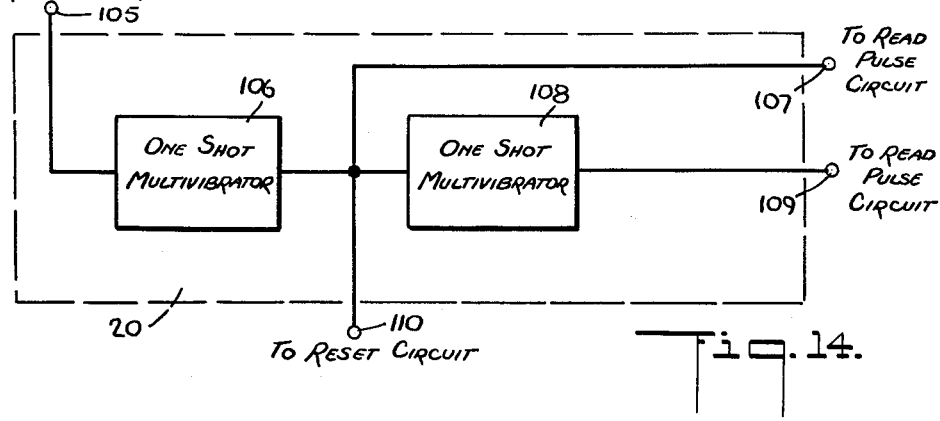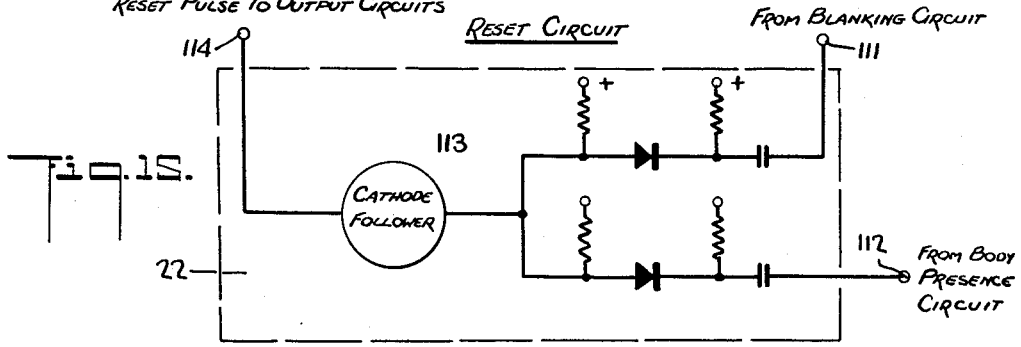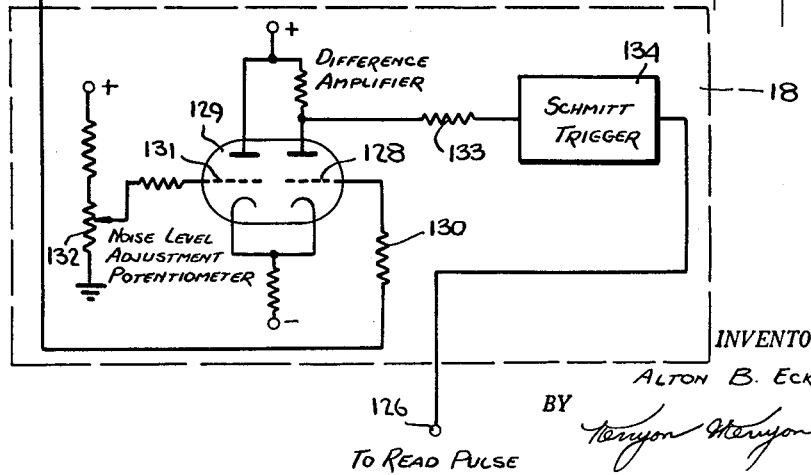

Feb. 2, 1965   A. B. ECKERT, JR   3,168,720
CHARACTER READER
Filed April 8, 1960   10 Sheets-Sheet 9
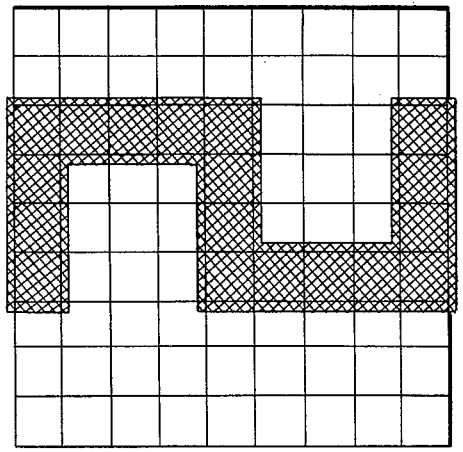
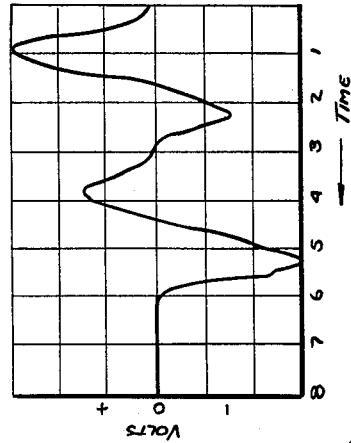
FIG.18B.
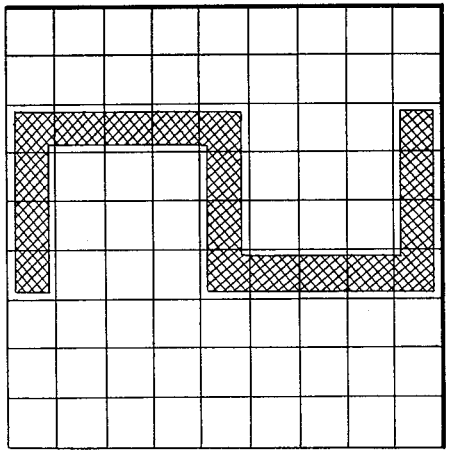
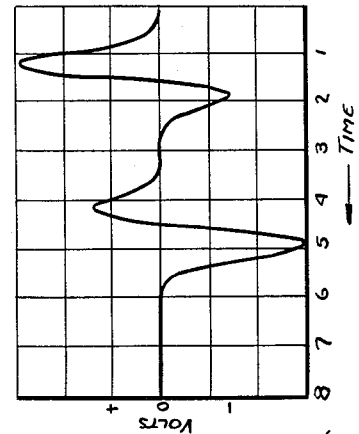
FIG.18A.
INVENTOR.
ALTON B. ECKERT, JR.
BY
ATTORNEYS Feb. 2, 1965  A. B. ECKERT, JR  3,168,720
CHARACTER READER
Filed April 8, 1960  10 Sheets—Sheet 10
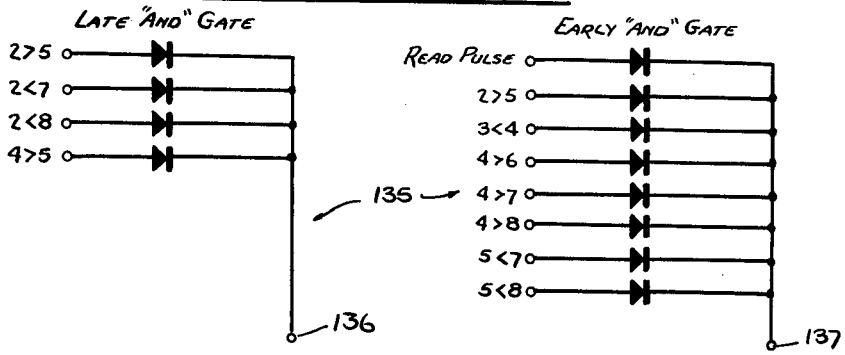
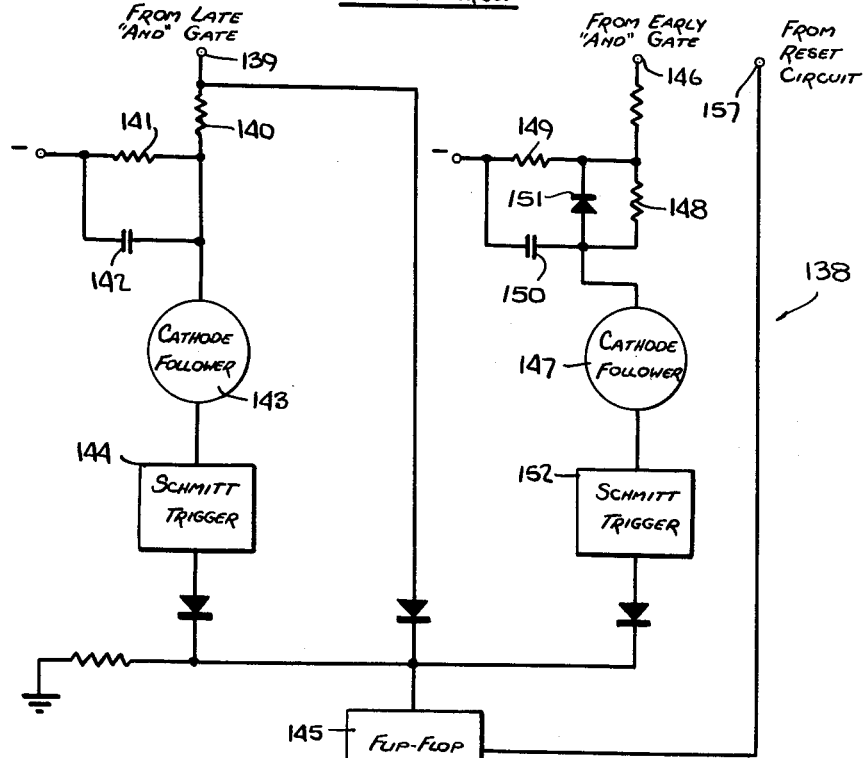
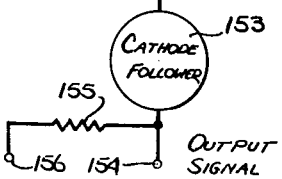
INVENTOR.
ALTON B. ECKERT, JR.
BY
Kenyon & Kenyon
ATTORNEYS United States Patent Office 3,168,720
Patented Feb. 2, 1965

3,168,720
CHARACTER READER
Alton B. Eckert, Jr., Port Chester, N.Y., assignor to Pitney-Bowes, Inc., Stamford, Conn., a corporation of Delaware
Filed Apr. 8, 1960, Ser. No. 20,948
23 Claims. (Cl. 340—146.3)

This invention relates generally to apparatus which recognizes printed characters and which provides an output signal indicative of the character recognized and more particularly to a system which recognizes characters embodying ferro-magnetic material.

With the advent of automatic machinery capable of handling and sorting material at a very high rate of speed, there has developed a need for control devices which are necessary to fully utilize the vast capabilities of such automatic handling and sorting machinery. Thus, for example, machines have been developed which are capable of handling and sorting bank checks at rates of the order of 750 checks per minute and greater. To realize the labor-saving advantages of such a machine, it is necessary to have a control device which is capable of extracting intelligence from a check being handled and transmitting such intelligence to the handling machine so that it will know how to treat the check, i.e., the machine will know into which sorting bin the check is to be directed.

The extremely limited amount of time available to the control device to both extract intelligence from the check and also convert this intelligence into a form which the sorting machine can be responsive to represents a major obstacle to the development of devices or apparatus which can perform this function. Because of the high speed with which such control devices must operate, a system in which intelligence is incorporated in the material to be sorted in the form of magnetically active symbols or characters is suggested.

It is known in the art that a character embodying a magnetically active substance, capable of being magnetically oriented, produces an electrical wave form when scanned with a magnetic reading head. Such wave form is proportional to the time rate of change of the magnetic flux sensed by the reading head.

The present invention is directed to means whereby the electrical wave form of a character such as described above may be recognized. Accordingly, it is an object of the present invention to provide a system for recognizing characters by their configuration.

Another object of the present invention is to provide a system in which a particular character may be recognized and such recognition manifested by a signal output.

A further object of the present invention is to provide a system in which characters may be recognized by their configuration although such configuration as presented to the said system is slightly inaccurate.

Another object of the present invention is to provide a system for recognizing characters by their configuration in which the possibility of mis-identification is minimized by incorporation of means which indicate that one electrical wave form resulted in a plurality of output signals.

These and other objects of the present invention are achieved by analyzing the electrical wave form, obtained by use of a magnetic reading head as described above, in a logical manner. Briefly stated, a character reader according to one embodiment of the present invention includes a sensing mechanism which produces a distinctive electrical wave form for each different character that is scanned. After being amplified, the wave form is fed to a delay line circuit which has a plurality of taps spaced along the delay line. Each tap provides a voltage output proportional to the magnitude of the voltage at the tap.

A plurality of comparators is provided, each of which compares the magnitude of the voltage output of two different taps. The output of each comparator is indicative of the result of the comparison it makes. The comparators, therefore, provide a distinctive pattern of outputs for each of the different wave forms.

A plurality of logic circuits is provided, one for each different character to be read. Each logic circuit is arranged to recognize the distinctive pattern of comparator outputs resulting from the distinctive wave form produced by each of the different characters.

A separate output circuit is provided for each logic circuit. When any one of the logic circuits recognizes a distinctive pattern of comparator outputs, that logic circuit sends a truth pulse to its associated output circuit which, in turn, produces an output thereby indicating recognition of the respective character. The output may then be introduced into computing means or directly into a machine, for example, to direct the handling of the body bearing the recognized character.

The present invention may be more readily understood in conjunction with the following drawings, in which:

FIG. 8 is a schematic diagram of the comparator employed as shown in FIG. 4;

FIG. 9 is a schematic diagram of the logic circuits eemployed as shown in FIG. 4;

FIG. 10 is a schematic diagram of the read pulse circuit employed as shown in FIG. 4;

FIG. 11 is a schematic diagram of the output circuits employed as shown in FIG. 4;

FIG. 12 is a schematic diagram of the character presence circuit employed as shown in FIG. 4;

FIG. 13 is a schematic diagram of the multiple output circuit employed as shown in FIG. 4;

FIG. 14 is a schematic diagram of the blanking circuit employed as shown in FIG. 4;

FIG. 15 is a schematic diagram of the reset circuit employed as shown in FIG. 4;

FIG. 17 is a schematic diagram of the noise level circuit employed as shown in FIG. 4;

FIGS. 18A and 18B depict an underprinted character "2" and its associated electrical wave form, and an overprinted character "2" and its associated electrical wave form respectively.

FIG. 19 is a schematic diagram of an "early" and "late" logic circuit employed in a third embodiment of the present invention;

FIG. 20 is an output circuit employed in said third embodiment.

Figure 1:
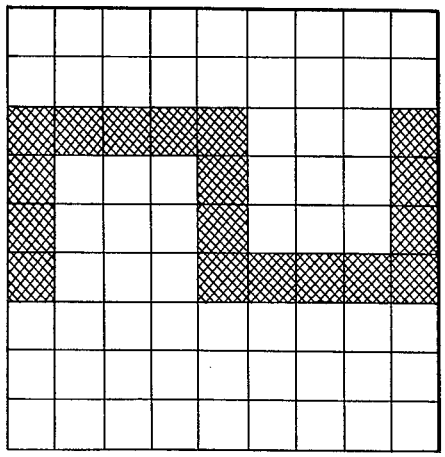
FIG. 1 is a graphic representation of a character, numeral "2," of the type which when magnetized may be recognized by the present invention.

With respect now to the drawings, and more particularly to FIG. 1, there is depicted a graphic representation of character "2" of the type which may be recognized by the apparatus of the present invention. As is customary, the character is printed with an ink containing ferromagnetic particles which may be magnetized and oriented. When such a character is scanned by a magnetic reading head, a wave form representative of the configuration of the character is produced. Scanning may also be effected photoelectrically or by other means sensitive to the dark and light values of the character to produce a wave form representative thereof. It is to be understood that the invention is not limited to numerical characters and is applicable to alphabetical or other symbolic formations, and that scanning of the characters may be in any known form capable of producing a wave form representative of the character scanned.

Figure 2:
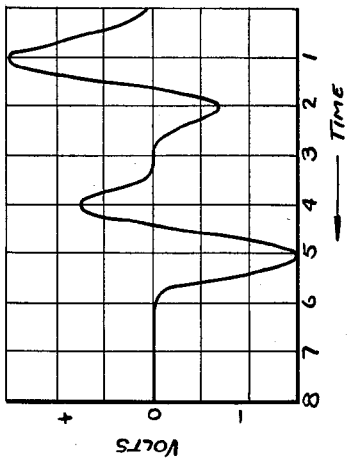
FIG. 2 is the electrical wave form generated by scanning the magnetized character of FIG. 1 with a magnetic reading head.

FIG. 2 depicts the electrical wave form produced by scanning the character of FIG. 1 in a direction from right to left, such a method of scanning being equivalent to movement of the character past a reading head from left to right. The wave form of FIG. 2 is in units of voltage as a function of units of time, point 1 on the time axis representing the instant at which the leading edge of the character is aligned with the gap 28 of the magnetic reading head 27 (see FIG. 5).

At this point, it may be briefly mentioned that the character reader of the present invention is capable of recognizing one character within any group of characters providing the characters each have a distinctive wave form. As will be seen from the discussion following, the character reader of the present invention is able to recognize the respective characters by comparing with each other the relative magnitudes of the voltages at a plurality of sampling points on each wave form.

Figure 3:
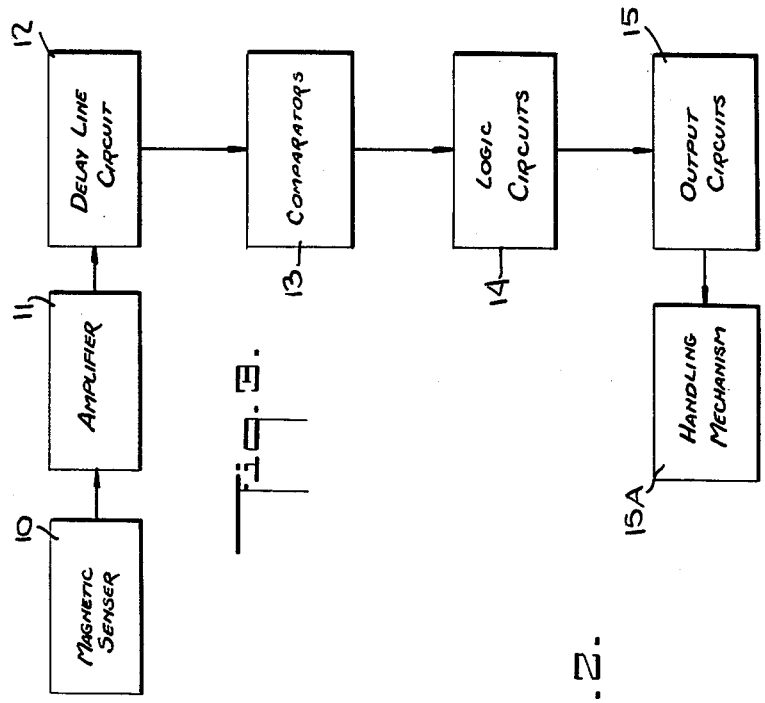
FIG. 3 is a block diagram of one embodiment of the present invention.

FIG. 3 is a block diagram of one embodiment of the device of the present invention. As depicted, magnetic sensor 10 is employed to provide an electrical wave form of the type shown in FIG. 2. This information is fed to amplifier 11.

The amplified signal from amplifier 11 is then introduced into delay line circuit 12. Delay line circuit 12 serves as the source of sampling voltages which are representative of various points of the amplified electrical wave form.

A plurality of comparators 13 is provided. Each comparator 13 is a difference amplifier which receives two different sampling voltages. Each difference amplifier produces one signal if one of the sampling voltages it receives is greater than the second and produces a different signal if the second of the two sampling voltages it receives is greater than the first.

The outputs or difference signals of the comparators 13 are introduced into logic circuits 14. There is a separate logic circuit 14 for each of the characters in the group to be recognized. Each logic circuit is arranged to provide a truth pulse if all of the conditions called for by the circuit are fulfilled, such conditions including a predetermined combination of difference signals.

At this point, it will be noted that the wave form produced by a character is sampled at at least eight different points. This number is chosen for convenience, it being clear that the invention is not restricted to the use of eight samples. The magnitudes of the voltages at these sampling points are compared one with the other, the maximum number of such comparisons that can be made being equal to $$\frac{n(n-1)}{2}$$

where $n$ is the number of different sampling points. If each wave is sampled at eight different points, therefore, twenty-eight comparisons is the maximum which can be made. Each comparison is effected by a separate comparator 13.

A separate logic circuit 14 is provided for each of the characters to be recognized, and each logic circuit 14 is responsive to the outputs of a predetermined combination of comparators 13 which distinguishes one wave form from the others. Of course, the number of sampling points, the number of comparators and the choice of the predetermined combination used in the logic circuits are all dependent on such factors as the number of different characters to be recognized and the distinctiveness of the respective wave forms produced thereby.

The truth pulse from the logic circuit 14 associated with the character being read is transmitted to one of a plurality of output circuits 15. A separate output circuit 15 is provided for each logic circuit. Each output circuit 15 is arranged so that a truth pulse from its associated logic circuit 14 will produce a corresponding output signal. The output signal from output circuits 15 may be introduced into handling mechanism 15A, as shown in FIG. 3. Handling mechanism 15A acts on the body bearing the recognized character or set of characters in accordance with a predetermined schedule. Thus, for example, if the body bearing the recognized characters is a check, the handling mechanism may be adapted to place a check in one of several compartments depending on what characters are on the check.

Figure 4:
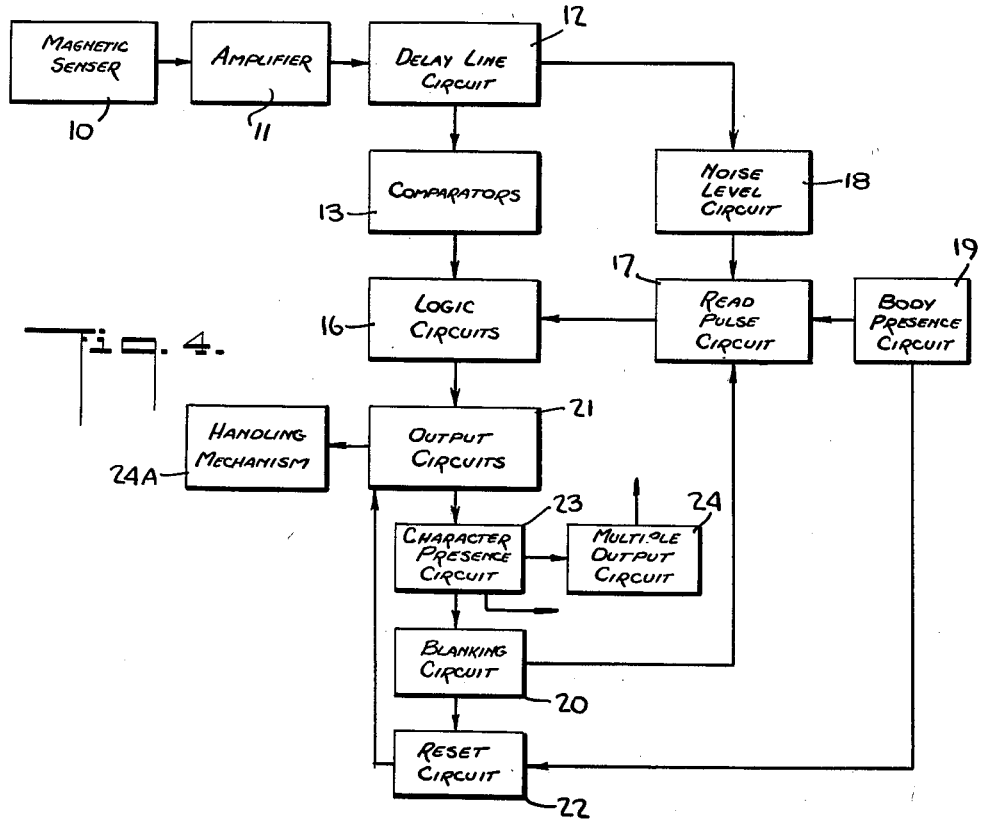
FIG. 4 is a block diagram of the second embodiment of the present invention.

A better appreciation of the mode of operation of the embodiment depicted in FIG. 3 may be had from a discussion of the second embodiment of this invention which is shown in FIG. 4. The blocks shown in FIG. 4 are identical to those in FIG. 3, which have the same reference numerals. Logic circuits 14 and output circuits 15 in the embodiment of FIG. 3 are different than their counterparts in the more complex embodiment of FIG. 4, these respective differences being disclosed in the discussions below.

Referring now to FIG. 4, magnetic sensor 10, amplifier 11, delay line circuit 12 and comparators 13 perform the same functions as in the embodiment shown in FIG. 3.

Logic circuits 16 of FIG. 4 embody all of the features of logic circuits 14 of FIG. 3. That is to say, these circuits are designed so that certain requirements relating to the amplitudes at selected points on the electrical wave form of the character being read must be fulfilled in order to obtain an output, or a truth pulse. In addition, each logic circuit 16 also requires that a pulse be received from read pulse circuit 17 before it may furnish an output or a truth signal.

Read pulse circuit 17, as will be explained more fully below, is activated only by simultaneous signals from noise level circuit 18, body presence circuit 19 and blanking circuit 20.

A truth signal from any one of logic circuits 16 is fed to an associated one of output circuits 21. Output circuits 21 differ from output circuits 15 as depicted in FIG. 3 in that the output signal from an actuated output circuit 21 will last until a reset signal is received from reset circuit 22.

As noted in FIG. 4, intelligence from output circuits 21 is transmitted to character presence circuit 23. The functions of character presence circuit 23, multiple output circuit 24 and blanking circuit 20 are related to the accuracy of this embodiment as discussed more fully below.

Figure 5:
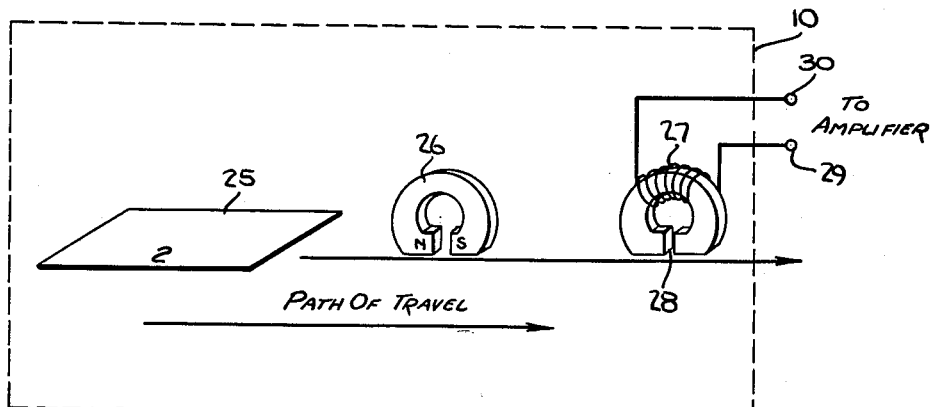
FIG. 5 is a schematic diagram of a magnetic senser employed as shown in FIG. 4.

FIG. 5 is a schematic diagram of magnetic sensor 10. Shown in FIG. 5 is a document 25, for example, a check, incorporating a magnetic character to aid in its identification. The character shown on check 25 is the numeral "2." In the usual fashion, check 25 is passed in close proximity to a permanent magnet 26 to magnetize and orient the particles contained in the character "2." Check 25 subsequently passes in close proximity to read head 27 which develops a voltage wave form, such as that shown in FIG. 2, by virtue of the change in magnetic flux caused by movement of character "2" past the gap 28 in the read head 27.

The units of time shown as one axis of the graph in FIG. 2 read from right to left since this wave form is assumed to have been developed by the movement of check 25, for example, past read head 27 in a direction from left to right. The electrical impulses comprising the wave form of FIG. 2 are transmitted to amplifier 11 through terminals 29 and 30 shown in FIG. 5. While the drawings show check movement relative to the magnet and reading head, it is to be understood that it is also possible to move the magnetic elements relative to the stationary check.

Figure 6:
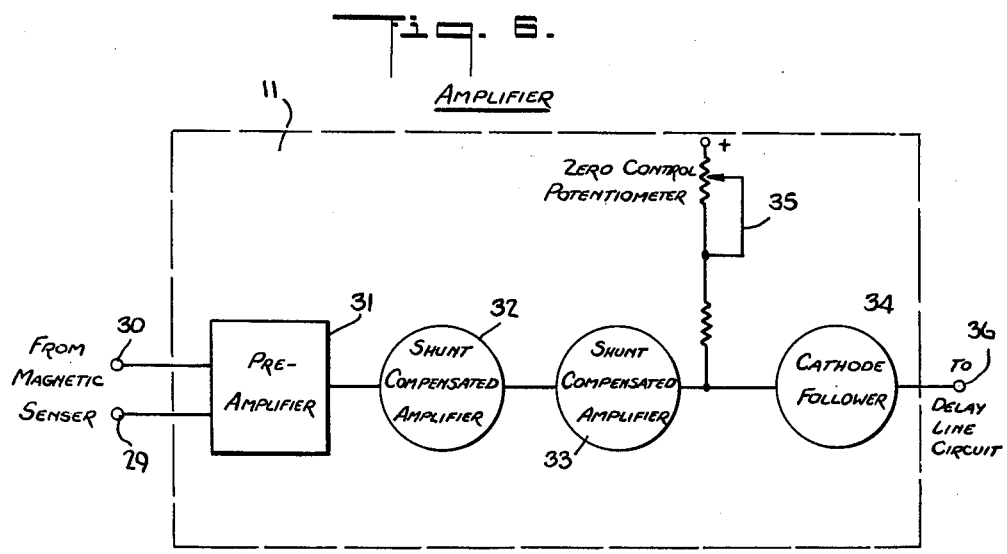
FIG. 6 is a schematic diagram of an amplifier employed as shown in FIG. 4.

FIG. 6 depicts amplifier 11. The electrical signals from magnetic senser 10 are introduced into pre-amplifier 31. The latter may be a low level A.C. amplifier having a 250 to 7000 c.p.s. band pass. The gain of this amplifier may be in the range of from 100 to 200.

The output of pre-amplifier 31 is fed to series connected shunt compensated amplifiers 32 and 33. Amplifiers 32 and 33, with their sharp high frequency cut-off and linear phase shift characteristics, serve to increase the signal-to-noise ratio.

The output of amplifier 33 is fed to a cathode follower 34 having a zero control potentiometer 35 at the input. The output of cathode follower 34 is connected to delay line circuit 12 through terminal 36. Zero control potentiometer 35 is provided to minimize the D.C. component of the current through delay line circuit 12.

Figure 7:
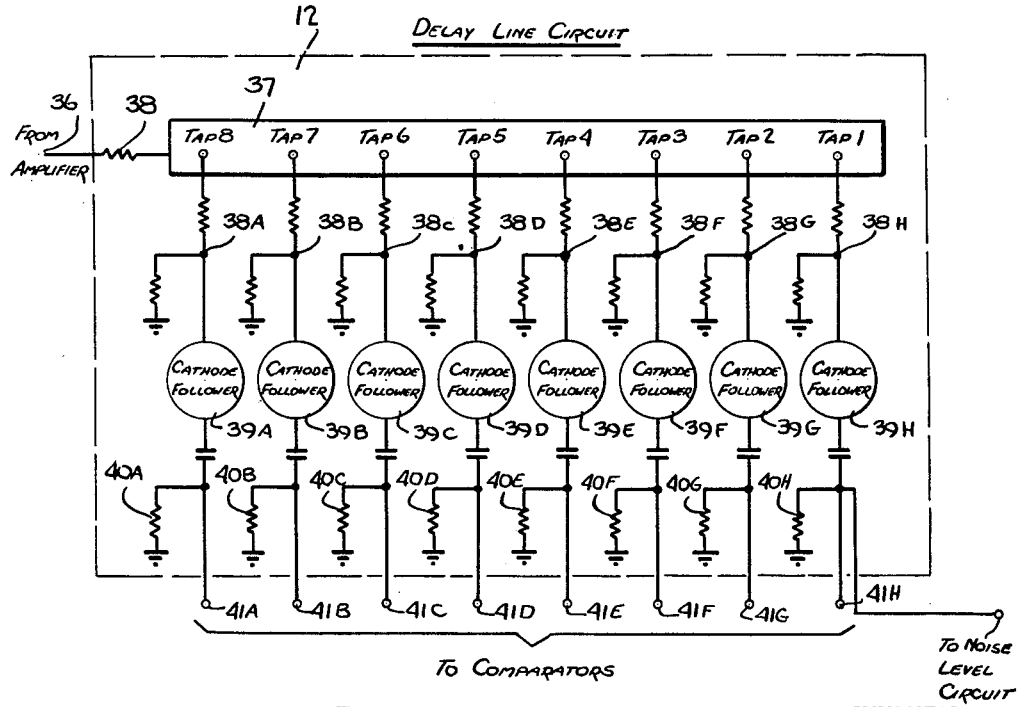
FIG. 7 is a schematic diagram of a delay line circuit employed as shown in FIG. 4.

FIG. 7 shows a preferred form of delay line circuit 12. The output of the cathode follower 34 is introduced into delay line 37 through a matching resistor 38. Delay line 37 may be any conventional type of high quality such as, for example, a bridged T network provided it has a linear phase shift in the frequency range of interest. Delay line 37 is designed so that there is an equal time delay between adjacent taps in the series of taps 1 through 8.

To compensate for losses in delay line 37, voltage dividers 38A through 38H of appropriate resistive values are provided. The outputs of cathode followers 39A through 39H are then connected through resistor-capacitor networks 40A through 40H to terminals 41A through 41H.

In essence, the delay line circuit 12 is arranged to derive sample voltage values of an electrical wave form such as shown in FIG. 2 at eight different points. The taps in delay line 37 have been numbered from right to left to correspond to the numbering of the time axis of FIG. 2. The correspondence of tap number to units of time on the time axis of FIG. 2 facilitates the description of the operation of delay line 37, which, as stated above, is designed to proved samples of selected points on the wave form contained therein. Thus, when the electrical wave form of FIG. 2 is wholly within delay line 37, the voltage appearing at tap 8 corresponds to the voltage of the wave form of FIG. 2 at unit 8 on the time axis, the voltage at tap 7 of delay line 37 corresponds to the voltage at unit 7 on the time axis, etc.

Accordingly, the voltages appearing at terminals 41A through 41H of delay line circuit 12 are proportional to the instantaneous voltages of the wave form of FIG. 2 which correspond, respectively, to the tap positions of delay line 37. Thus, for example, the voltage at tap 1 is greater than the voltage appearing at tap 4 and accordingly, the voltage at terminal 41H will be proportionately greater than the voltage at terminal 41E.

A plurality of comparators 13 is provided. Each comparator 13 comprises a separate circuit, one of which is shown in detail in FIG. 8. The purpose of each comparator 13 is to compare the voltage appearing at two of terminals 41A through 41H of delay line circuit 12, and to provide a signal at a first terminal of the comparator if one of the voltages is greater than the other and, in the alternative, to provide a signal at a second terminal of the comparator if the second voltage signal is greater than the first.

The method provided for accomplishing this operation may be understood by reference to FIG. 8 which depicts a preferred circuit arrangement. The two voltages to be compared are introduced into the comparator 13 at terminals 42 and 43, respectively. For the purposes of this discussion, it is assumed that terminal 41D, representative of the voltage at tap 5, is connected to terminal 42, and that terminal 41E, representative of the voltage at tap 4, is connected to terminal 43. Terminals 42 and 43 are connected to the grids 44 and 45, respectively, of difference amplifier 46 through resistors 47 and 48, respectively. As is well known (see Pulse and Digital Circuits, by Millman and Taub, McGraw-Hill Book Company, 1956, pages 467 and 481 to 483), the output of difference amplifier 46 represents the amplified, algebraic difference between the signals appearing at terminals 42 and 43.

This output is fed through resistor 49 and zero level control potentiometer 50 to Schmitt trigger 51. Zero level control potentiometer 50 is employed to adjust the quiescent level of the signal from difference amplifier 46 to the midpoint of the triggering characteristics of Schmitt trigger 51. The Schmitt trigger produces an output at one of its two output terminals 52 and 53 depending upon the level of the signal input (see Pulse and Digital Circuits, by Millman and Taub, McGraw-Hill Book Company, 1956, pages 164 to 172).

Thus, for example, if the voltage at terminal 42 is greater than the voltage at terminal 43, the output from difference amplifier 46 will be smaller in magnitude than if the voltage at terminal 43 were greater than the voltage at terminal 42. As is well known, an input signal equal to or less than the lower triggering voltage of the Schmitt trigger causes one type of operation of the trigger, and an input signal equal to or greater than the upper triggering voltage produces a second type of operation. Thus, the signals appearing at output terminals 52 and 53 of Schmitt trigger 51 reflect which one of the signals appearing at terminals 42 and 43 is the greater.

Terminals 52 and 53 are connected to cathode followers 54 and 55, respectively, and thence to terminals 56 and 57, respectively. From the foregoing, it will be appreciated that a pulse at terminal 56 indicates that the voltage at tap 5 is greater than the voltage at tap 4, whereas a pulse appearing at terminal 57 indicates that the voltage at tap 4 is greater than the voltage at tap 5. Assuming, for example, that the wave form of FIG. 2 is present in the delay line 37, a pulse would appear at terminal 57 and not at terminal 56 since the voltage at tap 4 is in fact greater than the voltage on tap 5.

The pulse then appearing, for example, at terminal 57, and representing a truth, takes the form of a negative going square wave pulse. The reason for this arrangement will become clear from the following discussion of the logic circuits.

FIG. 9 depicts a prefered form of logic circuits 16. As depicted, the circuit is an "and" gate comprising a series of semi-conductive diodes.

The logic circuit 16 which is depicted in FIG. 9 is the one which corresponds to the character "2" whose voltage wave form is shown in FIG. 2. The logic circuit includes a plurality of input terminals 58 through 68, each of which is connected to a respective one of semi-conductive diodes 58A through 68A. As indicated in FIG. 9, in order to satisfy the requirements of the character "2" logic circuit, the voltage at tap 4 of delay line 37 must exceed the voltage at tap 5, as indicated by a signal at terminal 58, the voltage at tap 2 must be less than the voltage at tap 8, as indicated by a signal at terminal 59, etc., these signals representing a predetermined combination which is distinctive of the character "2." Additionally, a pulse must be received at terminal 68 from the read pulse circuit 17.

A truth signal is produced by the "and" gate when the voltage at its output terminal 69 forms a negative going square wave pulse. Thus, for example, when the voltage at tap 4 is not greater than the voltage at tap 5, the potential level at terminal 58 is equal to a certain value. As stated above, if the voltage at tap 4 is greater than the voltage at tap 5, the voltage at terminal 58 decreases to a second value below the said certain value as a result of the operation of the Schmitt trigger in the particular comparator 13. This lower value of voltage represents a truth. It is clear that so long as the voltage at any of the terminals 58 through 68 is greater than the truth voltage, the potential level at terminal 69 will likewise be greater than the truth voltage. In other words, in order for the voltage level at terminal 69 to change from a higher voltage to a second or lower voltage which represents a truth, the voltage at each and every one of terminals 58 through 68 must simultaneously be at the lower voltage level.

FIG. 10 is a schematic diagram of read pulse circuit 17. Read pulse circuit 17 is described at this point since a signal therefrom is necessary to produce a truth signal from each one of the logic circuits 16. As shown in FIG. 10, read pulse 17 is essentially an "and" gate. This "and" gate operates essentially in the same manner as each of the logic circuits 16, requiring simultaneous voltage inputs of proper magnitude in order to produce an output.

In order for a pulse to be transmitted to logic circuits 16 by read pulse circuit 17, signals of proper magnitude must be received simultaneously from four other circuits. As shown in FIG. 10, a signal must be received at terminal 70 from the noise level circuit 18. This circuit is employed to insure that a voltage wave form is actually present in delay line 37 and that the sampling voltages received therefrom are not spurious noise signals.

A signal must be received at terminal 71 from body presence circuit 19. Body presence circuit 19 is activated by the presence of a body, such as a check or other document, in the vicinity of the read head as will be described in detail below.

The two remaining signals which are required to actuate the read pulse "and" gate emanate from blanking circuit 20 and are transmitted through terminals 72 and 73. The voltage at terminals 72 and 73 is normally equal to a value consistent with the requirements of the read pulse "and" gate. However, after a character has been recognized, blanking pulses of greater magnitude appear at terminals 72 and 73 and prevent a read pulse output. These blanking pulses last until a second magnetic character is due to be recognized.

For impedance matching purposes, cathode follower 74 is employed to transmit the signals from read pulse circuit 17 to each one of the several logic circuits through terminal 75.

The truth signal from the logic circuit "and" gate, shown in FIG. 9, which has had all of its requirements fulfilled is then transmitted to the output circuit 21 associated therewith. That is to say, each character of the group to be recognized by the device of this invention has a separate channel comprising a logic circuit "and" gate 16 and an output circuit 21. FIG. 11 depicts a preferred form of output circuits 21. The negative going square wave pulse from terminal 69 of the logic circuit "and" gate 16, is introduced through terminal 69A into the output circuit 21 shown in FIG. 11.

An integrating network comprising resistors 76 and 77 and capacitor 78 is provided to insure that the signal received at terminal 69A is in fact a truth signal and not a result of spurious noise. When the signal voltage at terminal 69A drops to the lower or truth value, the voltage on capacitor 78 also decreases, but in exponential fashion. If the voltage at terminal 69A remains at the lower value for a substantial period of time, the voltage at the input to cathode follower 79 ultimately reaches the triggering voltage of Schmitt trigger 80, thereby producing an output pulse which is fed to flip-flop 81.

The operation of a flip-flop such as the one designated by reference numeral 81 in FIG. 11 is well known in the art (see Pulse and Digital Circuits, by Millman and Taub, McGraw-Hill Book Company, 1956, page 140). So long as flip-flop 81 is in reset condition, it will respond to an output pulse from Schmitt trigger 80 by continuously transmitting a pulse through cathode follower 83 to output terminal 84. After having responded to Schmitt trigger 80, flip-flop 81 must be reset before it is capable of again responding to another output pulse from Schmitt trigger 80. Flip-flop 81 is reset by receiving a reset pulse from reset circuit 22 as will later be described.

The output signal at terminal 84, which corresponds to recognition of a character, may be transmitted to a computing device or to a control mechanism for directing the operation of the machinery handling the check or document incorporating the recognized character. As depicted in FIG. 4, the output signal is fed to handling mechanism 24A which acts on the body or document bearing the recognized characters.

The output signal from cathode follower 83 is also transmitted through resistor 85 to character presence circuit 23 through terminal 86.

FIG. 12 depicts character presence circuit 23 which cooperates with blanking circuit 20 to prevent, except during an interval of time following the first recognition, the possibility of obtaining a second recognition for a single character passing beneath the read head 27. Character presence circuit 23 also provides a signal which is indicative of the fact that a character has been recognized. Additionally, character presence circuit 23 cooperates with multiple output circuit 24 to indicate that two or more "recognitions" have occurred for the same character.

Referring now to FIG. 12, the output terminals 86 of each of output circuits 21 is connected to a respective one of terminals 87A, 87B, 87C, etc. In the normal situation, only one of terminals 87A, 87B, etc. receives an output pulse for each character that passes read head 27. However, if for any reason more than one "recognition" occurs for a particular character, then more than one of terminals 87A, 87B, etc. will receive a signal from its associated output circuit 21.

All of terminals 87A, 87B, etc. are connected to cathode followers 88. By virtue of the resistor network employed in output circuits 21, the voltage at the input to cathode follower 88 is proportional to the number of signals received. That is to say, an output signal which appears, for example, at terminal 87A, will produce a voltage change of one order of magnitude at the input to cathode follower 88. If two input signals are received, for example, one at each of terminals 87A and 87B, the voltage at the input of cathode follower 88 will be approximately double the previous voltage.

The output of cathode follower 88 is connected to a D.C. restorer comprising capacitor 89, resistor 90 and diode 91. The junction 92 of resistor 90 and diode 91 is connected to output terminal 93 of character presence circuit 23. This terminal is connected to multiple output circuit 24.

The voltage at point 92 is also introduced at one input of difference amplifier 94. The voltage level of the other input of difference amplifier 94 is determined by character presence control potentiometer 95. The sensitivity of this circuit is adjusted so that difference amplifier 94 is cut off when no signal appears at any of terminals 87A, 87B, etc. However, difference amplifier 94 produces an output signal when a signal from at least one of output circuits 21 appears at terminals 87A, 87B, etc.

The output signal thus obtained from difference amplifier 94 is shaped by Schmitt trigger 95A. The output signal of Schmitt trigger 95A is fed to one shot multivibrator 96, the operation of which is well known. (See Pulse and Digital Circuits, by Millman and Taub, McGraw-Hill Book Company, 1956, page 174.) Multivibrator 96 produces a pulse of short duration which is fed through cathode follower 97 to terminal 98. The signal at terminal 98 is indicative of the fact that the device has recognized a character and this signal may be introduced into associated equipment for counting purposes and the like.

The pulse from one shot multivibrator 96 is also fed to blanking circuit 20 through terminal 99.

It will be apparent from the above that character presence circuit 23 will produce an output at each of terminals 98 and 99 so long as a signal appears at at least one of input terminals 87A, 87B, etc. If a respective signal appears at more than one of input terminals 87A, 87B, etc. as will occur if an output is produced by more than one of the output circuits 21, indicating more than one recognition for a single character, then the voltage at terminal 93 will be correspondingly higher than it would be if a signal had appeared at only one of input terminals 87A, 87B, etc. Terminals 93 is connected to multiple output circuit 24 now to be described.

FIG. 13 depicts multiple output circuit 24. Multiple output circuit 24 is designed to indicate that more than one "recognition" has occurred for a single character passing under the read head.

The terminal 93 of character presence circuit 23 is connected to multiple output circuit 24 through terminal 100. Multiple output circuit 24 functions in a manner similar to character presence 23 in that difference amplifier 101 is employed to compare the voltage at terminal 100 with a reference voltage determined by multiple output control potentiometer 102.

Multiple output control potentiometer 102 is set so that difference amplifier 101 is cut off unless the voltage appearing at terminal 100 is at least equal to a value which reflects receipt of two or more output pulses at the input of cathode follower 88 in character presence 23. Thus, the introduction of two or more outputs into cathode follower 88 causes difference amplifier 101 to produce an output pulse which is coupled through cathode follower 103 to terminal 104. The signal appearing at terminal 104 may be utilized in one of the ways well known in the art to provide either a visible or audible signal, or in the alternative, may be introduced into a control device to reject a document bearing a character which was misread. On the other hand, if the character is not misread and only one output appears at the input of cathode follower 88, the voltage at terminal 100 is insufficient to change the operating condition of difference amplifier 101 and accordingly, difference amplifier 101 produces no output pulse.

FIG. 14 depicts blanking circuit 20. As indicated above in the description of read pulse circuit 17, there can be no output from read pulse circuit 17 so long as a voltage signal of a certain value is received from blanking circuit 20 at either terminal 72 or terminal 73. Blanking circuit 20 is trigged by the trailing end of the pulse from one-shot multivibrator 96 of character presence circuit 23, such pulse appearing at terminal 99 in FIG. 12. Thus, blanking circuit 20 is not triggered simultaneously with the production of a character presence signal but is delayed for a period of time equal to the width of the pulse from one-shot multivibrator 96. Terminal 99 is connected to terminal 105 in FIG. 14.

The trailing end of the pulse produced by one-shot multivibrator 96 triggers one-shot multivibrator 106. The pulse produced by multivibrator 106, which appears at output terminal 107 of the blanking circuit has a duration equivalent to slightly less than one-half the spacing of characters. That is to say, if the characters are spaced ⅛ inch from leading edge to leading edge, the pulse of one-shot multivibrator 106 lasts for slightly less than the period of time required for the document to move a distance of ¹⁄₁₆ inch relative to the read head.

The trailing end of the pulse produced by one-shot multivibrator 106 triggers one-shot multivibrator 108. Multivibrator 108 also produces a pulse that lasts for slightly less than the period of time during which the document moves one-half of a character spacing relative to the read head. The pulse from multivibrator 108 appears at output terminal 109. Output terminals 107 and 109 are connected to input terminals 72 and 73, respectively, of read pulse circuit 17 whereby the latter is prevented from producing an output signal during a time interval beginning shortly after a character has been recognized and lasting until the next character is due to be recognized. Since a character cannot be recognized until its wave form is entirely within the delay line, a recognition cannot occur until the character has completed its travel past the read head.

The function of blanking circuit 20 is to prevent the character reader from producing an output indicative of a second recognition of a character a short time interval after the reader has already made a first recognition of that same character. It is possible in certain instances to produce a recognition from the trailing end portion of a voltage wave form such as that shown in FIG. 2 or, more likely, from the combination of the trailing end portion of one wave form and the leading end portion of the next successive wave form. By preventing the character reader from producing a recognition until the next character is due to be recognized, this possibility is avoided.

As noted above, blanking circuit 20 is triggered by the trailing end of the pulse from character presence 23. Accordingly, for the duration of the pulse from character presence circuit 23 to blanking circuit 20, the latter will not prevent read pulse circuit 17 from permitting another recognition to occur by any one of the other logic circuits 16. This is advantageous because, as a result, any such additional recognitions by any of the other logic circuits 16 occurring throughout the duration of the character presence pulse, which could be caused by a distorted character, will then read out as a multiple output to indicate an error. The advantage, of course, is that otherwise only the first recognition of a distorted character would read out, and the first recognition of distorted character could well be an incorrect one.

As indicated in FIG. 14, the output of one-shot multivibrator 106 also appears at terminal 110. Terminal 110 is connected to terminal 111 of reset circuit 22 which is shown in FIG. 15.

As described above, each time any one of the output circuits 21 produces an output at its terminal 84 to indicate the recognition of a character, the flip-flop 81 of that output circuit must be reset before the next character is due to be recognized. The flip-flop 81 of each of output circuits 21 is reset by receiving a reset pulse from the reset circuit 22.

As shown in FIG. 15, the reset circuit 22 comprises an "or" gate, having an input terminal 111 connected to blanking circuit 20 and an input terminal 112 connected to check presence circuit 19. Thus, a pulse from either blanking circuit 20 or body presence circuit 19 will produce a pulse at the input of cathode follower 113. This, in turn, results in a pulse at terminal 114 which is connected to the output of cathode follower 113.

Output terminal 114 of reset circuit 22 is connected to the respective terminals 82 of all of the output circuits 21. Accordingly, each time a character is recognized, blanking circuit 20 causes reset circuit 22 to reset all of the flip-flops 81, even though only one of these flip-flops will ordinarily require resetting. Thus, all of the flip-flops 81 will ordinarily be in reset condition prior to movement of each successive character-bearing document past read head 27. To ensure that this is the case, body presence circuit 19, to be described, is effective to cause reset circuit 22 to reset all of the flip-flops 81 before the first character appearing on a document is due to be sensed by reading head 27.

It is desired that the character reader be in an inoperative condition, that is, incapable of producing an output until the portion of the document bearing the magnetic characters is in the vicinity of read head 27. Body presence circuit 19, which is depicted in FIG. 16 also serves to accomplish this result in addition to providing assurance in the instance of reset circuit 22 as described above.

Figure 16:
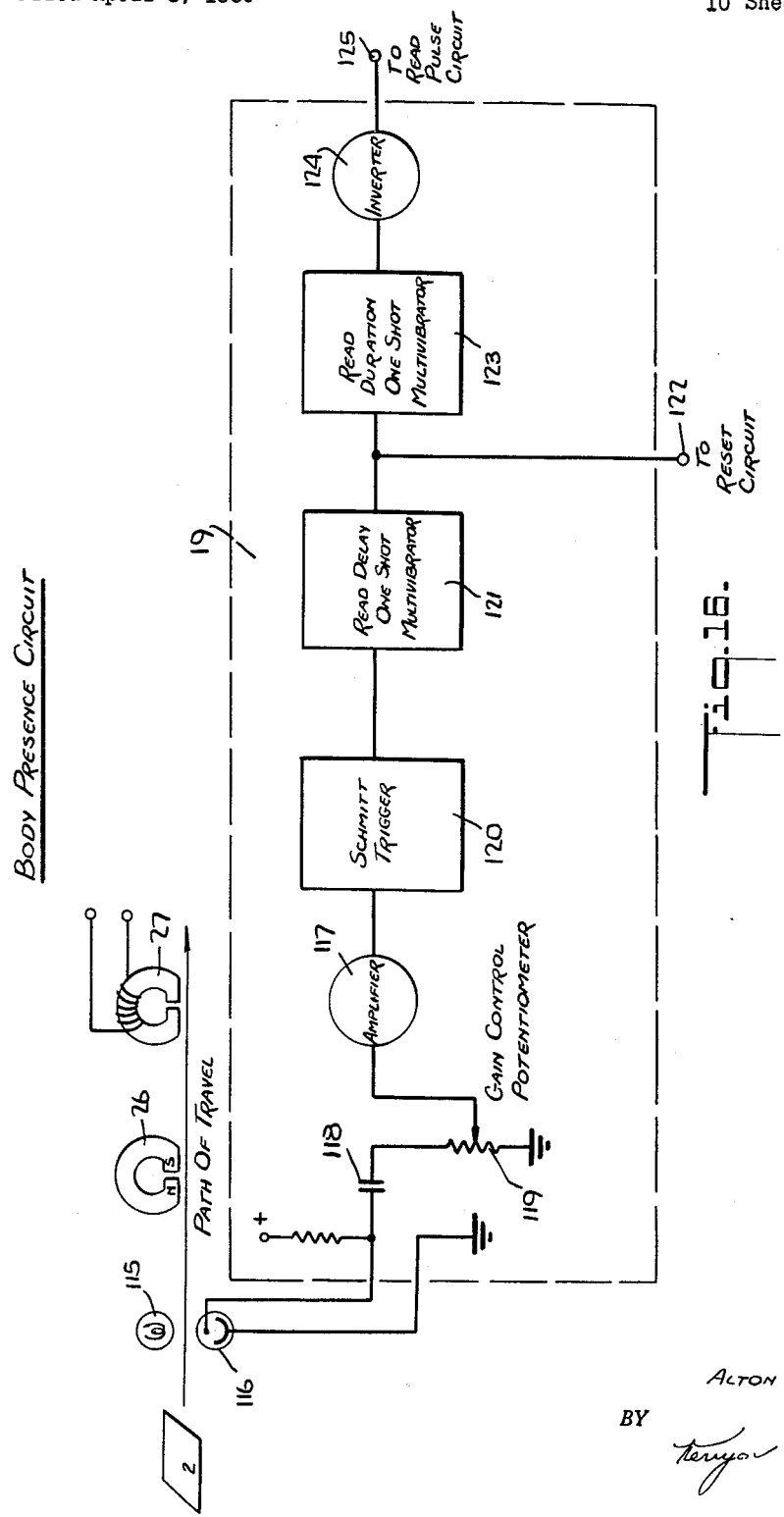
FIG. 16 is a schematic diagram of the body presence circuit employed as shown in FIG. 4.

As shown in FIG. 16, the document first passes between light source 115 and photocell 116 and, subsequently along the path of its travel, passes beneath magnet 26 and read head 27. The circuit is actuated by the document interrupting the light beam from light source 115 to photocell 116. Photocell 116 is coupled to amplifier 117 through capacitor 118 and gain control potentiometer 119. When the light beam is interrupted, photocell 116 produces a signal which after being amplified by amplifier 117, is introduced into Schmitt trigger 120, and the latter converts the signal to a square wave pulse. The square wave output of Schmitt trigger 120 is used to drive read delay one-shot multivibrator 121.

By adjusting the voltage level necessary to actuate multivibrator 121, triggering of this element is delayed for the time necessary for the document to reach the vicinity of read head 27 after passing between light source 115 and photocell 116.

As indicated in FIG. 16, the output of multivibrator 121 appears at terminal 122 which is connected to the "or" gate in reset circuit 22 through terminal 112. In this manner, reset circuit 22 is caused to produce a reset pulse each time a document is fed to the vicinity of read head 27. As noted above, this ensures that the flip-flops 81 of all of output circuits 21 will be in reset condition before the first character to be read is sensed by read head 27.

The output pulse from multivibrator 121 is also employed to trigger read duration one-shot multivibrator 123. This multivibrator produces a pulse which has a duration equal to the length of time necessary for the entire set of characters on the document to pass read head 27. As shown in FIG. 16, the output of multivibrator 123 is inverted by inverter 124 and appears at terminal 125. The pulse appearing at terminal 125 is introduced into read pulse 17 through terminal 71.

FIG. 17 depicts the noise level circuit 18. This circuit furnishes a signal from terminal 126 to read pulse circuit 17 through terminal 70. Unless a signal is received from noise level circuit 18, read pulse circuit 17 is unable to furnish a read pulse signal to the logic circuits 16. The noise level circuit 18 is employed as additional assurance that spurious noise signals will not result in an incorrect recognition.

As shown in FIG. 17, terminal 127, which receives a signal emanating at tap 1 of delay line 37, is connected to grid 128 of difference amplifier 129 through resistor 130. Grid 131 of difference amplifier 129 is connected to noise level adjustment 132. By setting noise level adjustment 132 appropriately, difference amplifier 129 produces an output signal of sufficient amplitude to operate Schmitt trigger 134 only if the signal received through terminal 127 from tap 1 is greater than a predetermined minimum voltage.

The signal from difference amplifier 129 is fed through resistor 133 to Schmitt trigger 134. The output of Schmitt trigger 134 is connected to terminal 126. Thus, when a voltage wave form such as that shown in FIG. 2 is present in delay line 37, a negative-going pulse appears at terminal 126. This negative-going pulse is transmitted to the "and" gate of read pulse circuit 17, thereby permitting read pulse circuit 17 to furnish an output signal if all other conditions are satisfied.

In certain instances, faulty printing of characters will cause difficulty due to the variations from normal of their electrical wave forms. FIG. 18A depicts an underprinted numeral "2" and its associated electrical wave form. FIG. 18B depicts an overprinted numeral "2" and its associated electrical wave form.

Comparison of the wave forms of FIGS. 18A and 18B with that of FIG. 2 indicates that the wave form is shifted in time, some peaks being advanced and others being retarded. Thus, comparing the wave form of FIG. 18A with that of FIG. 2, it is seen that the peak which occurs exactly at one unit of time in FIG. 2, occurs subsequent to this time in FIG. 18A. In consideration of the early and late characteristics of overprinted and underprinted characters, a third embodiment of the invention is provided. The third embodiment of the invention differs from the second embodiment only in a modification of the logic circuits and the output circuits, as will be described below. The block diagram of FIG. 4 thus serves as a basis for the description of this third embodiment.

FIG. 19 depicts the logic circuit 135 for the character "2." According to the third embodiment of the invention, this logic circuit is one of a number of such circuits, employed as described above in conjunction with FIG. 4. As depicted, the character "2" logic circuit 135 is composed of a late "and" gate and an early "and" gate. It will be noted that with the exception of a duplication of signals from the 2>5 output terminal of the respective comparator 13, the balance of the combined conditions called for by the early and late "and" gates are identical to those employed in the single "and" gate of the second embodiment described above in conjunction with FIG. 4.

According to the third embodiment, the single "and" gate of the second embodiment has been subdivided to form early and late "and" gates to minimize the effect of variation in wave forms resulting from overprinting or underprinting of characters. As discussed above, the truth signal which is produced by the logic circuit when all of its conditions have been fulfilled must necessarily endure for a relatively substantial period of time in order to trigger the output circuit associated therewith. In the embodiment using a single "and" gate, all of the conditions called for by the "and" gate occur, if at all, approximately simultaneously since the delay line 37 is designed for an accurately printed character and its electrical wave form. These simultaneously occurring conditions prevail for the substantial period of time necessary to trigger the output circuits.

It has been found that when the character to be recognized is overprinted or underprinted, some of the conditions called for by the "and" gate will usually occur early and some will usually occur late. Since the signals corresponding to such conditions all have approximately the same duration, the chances of having all the conditions fulfilled for the required substantial period of time are greatly diminished. For this reason, the single "and" gate of the embodiment described above has been divided into early and late "and" gates. Those conditions which usually appear late comprise the late "and" gate, and those which usually appear early comprise the early "and" gate.

When the conditions called for by the late "and" gate are met, an output pulse appears at terminal 136 and when the conditions called for by the early "and" gate are fulfilled, an output pulse appears at terminal 137. Since, as discussed above, the output circuits require that the truth signals endure for a relatively substantial period of time, the use of both early and late "and" gates improves the response of the character reader in that all that is necessary is that the signals appearing at terminals 136 and 137 be coordinated in a manner described below.

FIG. 19 depicts an output circuit 138 according to the third embodiment comprising outputs. As in the second embodiment described above, there is a separate output circuit associated with each character to be read. The truth pulse from the late "and" gate of the associated logic circuit is introduced into the late section of the respective output circuit 138 through terminal 139. This section operates in the same manner as each of the output circuits 21 described above in the second embodiment. Thus, the signal appearing at terminal 139 is introduced into a capacitor resistor network comprising resistors 140 and 141 and capacitor 142. The resistor network causes capacitor 142 to discharge slowly and therefore the truth signal must endure for a period of time sufficient to permit the voltage across capacitor 142 to be reduced to a value which, when fed through cathode follower 143, triggers Schmitt trigger 144. The pulse produced by Schmitt trigger 144 is fed into an "and" gate which is connected to the input of flip-flop 145.

The truth signal from the early "and" gate of the associated logic circuit 135 is received at terminal 146. This signal is fed to cathode follower 147 through a network including resistors 148 and 149, capacitor 150 and diode 151. This network causes capacitor 150 to discharge at the same approximate rate as capacitor 142, but causes the time required for capacitor 150 to charge to be increased. Thus, as in the late section, the triggering of the Schmitt trigger associated with the section is delayed for a substantial period of time to ensure that the signal appearing at the input terminal is a truth signal rather than spurious noise. The presence of the additional resistor 148 in the early section network increases the time required for capacitor 150 to charge, as compared with the charge time of capacitor 142 in the late section. Accordingly, the effect of the trailing edge of the truth signal on Schmitt trigger 152 is delayed relative to the time sequence of the late section, by the additional time required for capacitor 150 to charge. In this manner, the square wave pulse produced by Schmitt trigger 152 is wider than the corresponding pulse produced by Schmitt trigger 144 or in other words, the additional time required for capacitor 150 to charge "stretches" the pulse produced by Schmitt trigger 152. This pulse "stretching" is necessary since all of the conditions of the early "gate" of the associated logic circuit 135 will be fulfilled at a time prior to fulfillment of the conditions of the respective late "and" gate. Such increased delay is necessary to assure the simultaneous presence of signals from the early and late "and" gates.

Terminal 139 is also directly connected to an "and" gate at the input of flip-flop 145. Thus, if Schmitt triggers 144 and 152 do not produce a pulse within the time during which the truth signal appears at terminal 139, the termination of a truth signal at 139 will result in an increase in the voltage at the input of flip-flop 145, thereby preventing flip-flop 145 from being actuated. This is to prevent pulse "stretching," as described above, in the late Schmitt trigger 144.

Flip-flop 145 is connected to cathode follower 153, and the latter is connected directly to terminal 154 and through resistor 155 to terminal 156. As in the embodiment described above, the signal at terminal 154 may be used to indicate that a recognition has been made. Also, as in the second embodiment, the signal appearing at terminal 156 is transmitted to the character presence circuit and flip-flop 145 is reset by a reset pulse appearing at terminal 157 from the reset circuit.

It is to be appreciated that the embodiments described above are merely illustrative of the present invention and variations may be made therein by one skilled in the art without departing from the spirit and scope of this invention.

I claim:

1. Apparatus capable of recognizing any one of a group of characters each of which has a distinctive configuration comprising first means for scanning any one of said characters to produce an electrical wave form representative of the configuration thereof, second means responsive to said wave form to derive simultaneous samples therefrom at a plurality of points spaced from each other along the time axis of the said wave form, third means for comparing said simultaneous samples one with another to produce a plurality of difference signals, and fourth means coupled to said third means to produce a truth pulse in response to a predetermined combination of difference signals which distinguishes the wave form of the character being scanned from the others in said group.

2. The apparatus of claim 1 in which the characters of said group each comprises ferromagnetic material and in which said first means comprises a magnetic reading head.

3. Apparatus capable of recognizing any one of a group of characters each of which has a distinctive configuration comprising sensing means for scanning any one of said characters to produce an electrical wave form representative of the configuration thereof, sampling means responsive to said wave form to derive simultaneous samples therefrom at a plurality of points spaced from each other along the time axis of the said wave form, comparator means for comparing the said wave form samples one with another to produce a plurality of difference signals, and logic means coupled to said comparator means to produce a truth pulse in response to a predetermined combination of difference signals which distinguishes the wave form of the character being scanned from the others in said group.

4. Apparatus capable of recognizing any one of a group of characters each of which has a distinctive configuration comprising sensing means for scanning any one of said characters to produce an electrical wave form representative of the configuration thereof, sampling means responsive to said wave form to derive simultaneous samples therefrom at a plurality of points spaced from each other along the time axis of the said wave form, comparator means for comparing the said wave form samples one with another to produce a plurality of difference signals, logic means coupled to said comparator means to produce a truth pulse in response to a predetermined combination of difference signals which distinguishes the wave form of the character being scanned from the others in said group, and an output means which produces an output signal in response to said truth pulse provided said truth pulse endures for a relatively substantial period of time.

5. Apparatus capable of recognizing the characters of a group each of which has a distinctive configuration comprising sensing means for scanning any one of said characters to produce an electrical wave form representative of the configuration thereof, sampling means responsive to said wave form to provide a plurality of simultaneous values therefrom, said values representing the respective magnitudes of said wave form at a plurality of points spaced from each other along the time axis of the said wave form, comparator means for comparing said simultaneous values one with another to produce a plurality of intelligence signals indicative of a greater than or less than relationship between the respective compared values, and logic means coupled to said comparator means to produce a truth pulse indicative of a character recognition in response to a predetermined combination of intelligence signals which distinguishes the wave form of the character being scanned from the others in said group.

6. Apparatus capable of recognizing the characters of a group each of which has a distinctive configuration comprising sensing means for scanning any one of said characters to produce an electrical wave form representative of the configuration thereof, sampling means responsive to said wave form to provide a plurality of simultaneous values therefrom, said values representing the respective magnitudes of said wave form at a plurality of points spaced from each other along the time axis of the said wave form, comparator means for comparing said simultaneous values one with another to produce a plurality of intelligence signals indicative of a greater than or less than relationship between the respective compared values, logic means coupled to said comparator means to produce a truth pulse indicative of a character recognition in response to a predetermined combination of intelligence signals which distinguishes the wave form of the character being scanned from the others in said group, and an output means coupled to said logic means to produce an output signal in response to said truth pulse provided said truth pulse endures for a relatively substantial period of time.

7. In combination, a body bearing at least one character of a group of characters each of which has a distinctive configuration, sensing means for scanning at least one of the characters on said body to produce an electrical wave form representative of the configuration of the character being scanned, sampling means responsive to said wave form to derive simultaneous samples therefrom at a plurality of points spaced from each other along the time axis of the said wave form, comparator means for comparing the said wave form samples one with another to produce a plurality of difference signals, and logic means coupled to said comparator means to produce a truth pulse indicative of a character recognition in response to a predetermined combination of difference signals which distinguishes the wave form of the character being scanned from the others in said group.

8. In combination, a body bearing at least one character of a group of characters each of which has a distinctive configuration, sensing means for scanning at least one of the characters on said body to produce an electrical wave form representative of the configuration of the character being scanned, sampling means responsive to said wave form to derive simultaneous samples therefrom at a plurality of points spaced from each other along the time axis of the said wave form, comparator means for comparing the said wave form samples one with another to produce a plurality of difference signals, logic means coupled to said comparator means to produce a truth pulse in response to a predetermined combination of difference signals which distinguishes the wave form of the character being scanned from the others in said group, and means which acts on the said body in response to the said truth pulse.

9. Apparatus capable of recognizing any one of a group of characters each of which has a distinctive configuration comprising sensing means for scanning any one of said characters to produce an electrical wave form representative of the configuration thereof, sampling means responsive to said wave form to derive simultaneous samples therefrom at a plurality of points spaced from each other along the time axis of the said wave form, comparator means for comparing the said wave form samples one with another to produce a plurality of difference signals, noise level means coupled to said sampling means to produce a noise level signal if the said wave form exceeds a threshold value, read pulse means, and logic means coupled to said comparator means and to said read pulse means to produce a truth pulse solely in response to (1) a predetermined combination of difference signals which distinguishes the wave form of the character being scanned from the others in said group and (2) a concurrent read pulse from said read pulse means.

10. The apparatus of claim 9 in which the characters of said group each comprises ferromagnetic material and in which said first means comprises a magnetic reading head.

11. In combination, a body bearing at least one character of a group of characters each of which has a distinctive configuration, sensing means for scanning at least one of the characters on said body to produce an electrical wave form representative of the configuration of the character being scanned, sampling means responsive to said wave form to derive simultaneous samples therefrom at a plurality of points spaced from each other along the time axis of said wave form, comparator means for comparing the said wave form samples one with another to produce a plurality of difference signals, body presence means responsive to the presence of said body in the vicinity of said sensing means to produce a body presence signal, read pulse means responsive to said body presence signal to produce a read pulse, logic means coupled to said comparator means and to said read pulse means to produce a truth pulse solely in response to (1) a predetermined combination of difference signals which distinguishes the wave form of the character being scanned from the others in said group and (2) a concurrent read pulse from said read pulse means.

12. In combination, a body bearing at least one character of a group of characters each of which has a distinctive configuration, sensing means for scanning at least one of the chraacters on said body to produce an electrical wave form representative of the configuration of the character being scanned, sampling means responsive to said wave form to derive simultaneous samples therefrom at a plurality of points spaced from each other along the time axis of said wave form, comparator means for comparing the said wave form samples one with another to produce a plurality of difference signals, body presence means responsive to the presence of said body in the vicinity of said sensing means to produce a body presence signal, noise level means coupled to said sampling means to produce a noise level signal if the said wave form exceeds a threshold value, read pulse means to produce a read pulse in response to (1) said noise level signal and (2) said body presence signal, logic means coupled to said comparator means and to said read pulse means to produce a truth pulse indicative of a character designation solely in response to (1) a predetermined combination of difference signals which distinguishes the wave form of the character being scanned from the others in said group and (2) a concurrent read pulse from said read pulse means, output means which produces an output signal in response to said truth pulse provided said truth pulse endures for a relatively substantial period of time, and blanking means responsive to said output signal which renders said read pulse means inoperative for a span of time commencing shortly after the production of said output signal and terminating when the next successive character is due to be recognized.

13. Apparatus capable of recognizing any one of a group of characters each of which has a distinctive configuration comprising sensing means for scanning any one of said characters to produce an electrical wave form representative of the configuration thereof, sampling means responsive to said wave form to derive simultaneous samples therefrom at a plurality of points spaced from each other along the time axis of said wave form, comparator means for comparing the said wave form samples one with another to produce a plurality of difference signals, logic means coupled to said comparator means to produce a truth pulse in response to a predetermined combination of difference signals which distinguishes the wave form of the character being scanned from the others in said group, an output means which produces an output signal in response to said truth pulse provided said truth pulse endures for a relatively substantial period of time, and means to produce a signal indicative of a multiple output in response to at least two concurrent output signals from said output means.

14. Apparatus capable of recognizing any one of a group of characters each of which has a distinctive configuration comprising sensing means for scanning any one of said characters to produce an electrical wave form representative of the configuration thereof, sampling means responsive to said wave form to derive simultaneous samples therefrom at a plurality of points spaced from each other along the time axis of the said wave form, comparator means for comparing the said wave form samples one with another to produce a plurality of difference signals, logic means coupled to said comparator means to produce a truth pulse in response to a predetermined combination of difference signals which distinguishes the wave form of the character being scanned from the others in said group, an output means which produces an output signal in response to said truth pulse provided said truth pulse endures for a relatively substantial period of time, and means coupled to said output means to produce a signal indicative of the presence of a character within the area scanned by said sensing means in response to a signal from said output means.

15. In combination, a body bearing at least one character of a group of characters each of which has a distinctive configuration, sensing means for scanning at least one of the characters on said body to produce an electrical wave form representative of the configuration of the character being scanned, sampling means responsive to said wave form to derive simultaneous samples therefrom at a plurality of points spaced from each other along the time axis of the said wave form, comparator means for comparing the said wave form samples one with another to produce a plurality of difference signals, body presence means responsive to the presence of said body in the vicinity of said sensing means to produce a body presence signal, logic means coupled to said comparator means to produce a truth pulse in response to a predetermined combination of intelligence signals which distinguishes the wave form of the character being scanned from the others in said group, output means to produce an output signal in response to said truth pulse, said output means being rendered insensitive to a subsequent truth pulse by the production of said output signal, means coupled to said output means to produce a character presence signal indicative of the presence of a character within the area scanned by said sensing mean in response to a signal from said output means, and reset means responsive to either (1) said character presence signal or (2) said body presence signal to restore said output means to a condition wherein it is again sensitive to a truth pulse.

16. In combination, a body bearing at least one character of a group of characters each of which has a distinctive configuration, sensing means for scanning at least one of the characters on said body to produce an electrical wave form representative of the configuration of the character being scanned, sampling means responsive to said wave form to derive simultaneous samples therefrom at a plurality of points spaced from each other along the time axis of said wave form, comparator means for comparing the said wave form samples one with another to produce a plurality of difference signals, body presence means responsive to the presence of said body in the vicinity of said sensing means to produce a body presence signal, noise level means coupled to said sampling means to produce a noise level signal if the said wave form exceeds a threshold value, read pulse means to produce a read pulse in response to (1) said noise level signal and (2) said body presence signal, logic means coupled to said comparator means and to said read pulse means to produce a truth pulse solely in response to (1) a predetermined combination of difference signals which distinguishes the wave form of the character being scanned from the others in said group and (2) a concurrent read pulse from said read pulse means, output means to produce an output signal in response to said truth pulse provided said truth pulse endures for a relatively substantial period of time, said output means being rendered insensitive to a subsequent truth pulse by the production of said output signal, means to produce a character presence signal indicative of the presence of a character within the area scanned by said sensing means in response to a signal from said output means, reset means responsive to either (1) said character presence signal or (2) said body presence signal to restore said output means to a condition wherein it is again sensitive to a truth pulse, blanking means responsive to said output signal which renders said read pulse means inoperative for a span of time commencing shortly after the production of said output signal and terminating when the next successive character is due to be recognized, and means to produce a signal indicative of a multiple output in response to at least two concurrent output signals from said output means.

17. The combination of claim 16 in which the characters of said group each comprises ferromagnetic material and in which said first means comprises a magnetic reading head.

18. The combination of claim 16 in which a handling means acts on the said body in response to said output signal.

19. Apparatus capable of recognizing any one of a group of characters each of which has a distinctive configuration comprising first means for scanning any one of said characters to produce an electrical wave form representative of the configuration thereof, the peaks of said electrical wave form being advanced and retarded in time in the event the scanned character is overprinted or underprinted, second means responsive to said wave form to derive simultaneous samples therefrom at a plurality of points spaced from each other along the time axis of the said wave form, third means for comparing the said wave form samples one with another to produce a plurality of difference signals, and fourth means coupled to said third means and comprising an early gate and a late gate, said early gate producing a pulse in response to a first predetermined combination of those of said plurality of difference signals which occur early, and said late gate producing a pulse in response to a second predetermined combination of those of said plurality of difference signals which occur late, said first and said second predetermined combinations of difference signals distinguishing the wave form of the character being scanned from the others in said group, said fourth means producing a truth pulse indicative of a recognition in response to concurrent pulses from said early gate and said late gate.

20. Apparatus capable of recognizing any one of a group of characters each of which has a distinctive configuration comprising sensing means for scanning any one of said characters to produce an electrical wave form representative of the configuration thereof, the peaks of said electrical wave form being advanced and retarded in time in the event the scanned character is overprinted or underprinted, sampling means responsive to said wave form to derive simultaneous samples therefrom at a plurality of points spaced from each other along the time axis of the said wave form, comparator means for comparing the said wave form samples one with another to produce a plurality of difference signals, logic means coupled to said comparator and comprising an early gate and a late gate, said early gate producing a pulse in response to a first predetermined combination of difference signals which occur early and said late gate producing a pulse in response to a second predetermined combination of difference signals which occur late, said first and said second predetermined combinations of difference signals distinguishing the wave form of the character being scanned from the others in said group, output means comprising an early section and a late section, said early section being responsive to the pulse from said early gate to produce an early signal provided said pulse from said early gate endures for a relatively substantial period of time, said late section being responsive to the pulse from said late gate to produce a late signal provided said pulse from said late gate endures for a relatively substantial period of time, said output means producing an output signal indicative of a recognition in the event that said early signal and said late signal are concurrent within the duration of the said pulse produced by said late gate.

21. In combination, a body bearing at least one character of a group of characters each of which has a distinctive configuration, sensing means for scanning at least one of the characters of said body to produce an electrical wave form representative of the configuration of the character being scanned, the peaks of said electrical wave form being advanced and retarded in time in the event the scanned character is overprinted or underprinted, sampling means responsive to said wave form to derive simultaneous samples therefrom at a plurality of points spaced from each other along the time axis of the said wave form, comparator means for comparing the said wave form samples one with another to produce a plurality of difference signals, body presence means responsive to the presence of said body in the vicinity of said sensing means to produce a body presence signal, noise level means coupled to said sampling means to produce a noise level signal if the said wave form exceeds a threshold value, read pulse means to produce a read pulse in response to (1) said body presence signal and (2) said noise level signal, logic means coupled to said comparator means and comprising an early gate and a late gate, said early gate producing a pulse in response to (1) a first predetermined combination of difference signals which occur early and (2) a concurrent read pulse from said gating means, and said late gate producing a pulse in response to a second predetermined combination of difference signals which occur late, said first and said second predetermined combinations of difference signals distinguishing the wave form of the character being scanned from the others in said group, output means comprising an early section and a late section, said early section being responsive to the pulse from said early gate to produce an early signal provided said pulse from said early gate endures for a relatively substantial period of time, and said late section being responsive to the pulse from said late gate to produce a late signal provided said pulse from said late gate endures for a relatively substantial period of time, said output means producing an output signal indicative of a recognition in the event that said early signal and said late signal are concurrent within the duration of said pulse produced by said late gate, said output means being rendered insensitive to a subsequent truth pulse by the production of said output signal, means to produce a character presence signal indicative of the presence of a character within the area scanned by said sensing means in response to a signal from said output means, reset means responsive to either (1) said character presence signal or (2) said body presence signal to restore said output means to a condition wherein it is again sensitive to a truth pulse, blanking means responsive to said output signal to render said read pulse means inoperative for a span of time commencing shortly after the production of said output signal and terminating when the next successive character is due to be recognized, and means to produce a signal indicative of a multiple output in response to at least two concurrent output signals from said output means.

22. The combination of claim 21 in which the characters of said group each comprises ferromagnetic material and in which said first means comprises a magnetic reading head.

23. The combination of claim 21 in which a handling means acts on said body in response to said output signal.

References Cited in the file of this patent
UNITED STATES PATENTS
2,927,303  Elbinger _____ Mar. 1, 1960
FOREIGN PATENTS
785,853  Great Britain _____ Nov. 6, 1957